United States Patent [19]
Slade et al.

[11] Patent Number: 5,613,293
[45] Date of Patent: Mar. 25, 1997

[54] METHOD OF MAKING A SMOOTH TOPOGRAPHY HEAD/DISK INTERFACE SURFACE ON A HEAD WITH PATTERNED POLE

[75] Inventors: Steven B. Slade, New Hope; Daniel P. Burbank, Minneapolis; William H. Nunne, Burnsville, all of Minn.

[73] Assignee: Seagate Technology, Inc., Scotts Valley, Calif.

[21] Appl. No.: 476,899

[22] Filed: Jun. 7, 1995

[51] Int. Cl.⁶ .................................................. G11B 5/42
[52] U.S. Cl. ................................. 29/603.12; 29/603.15; 360/122
[58] Field of Search ..................... 360/122; 29/603.12, 29/603.15, 603.18, 603.16, 603.14

[56] References Cited

U.S. PATENT DOCUMENTS

| | | | |
|---|---|---|---|
| 4,143,458 | 3/1979 | Gibson | 29/603.12 |
| 4,188,247 | 2/1980 | Ridgway et al. | 156/154 |
| 4,295,173 | 10/1981 | Romankiw et al. | 360/125 |
| 4,732,600 | 3/1988 | Schiller | 29/603.12 X |
| 5,321,882 | 6/1994 | Zarouri et al. | 29/603.12 X |

FOREIGN PATENT DOCUMENTS

| | | |
|---|---|---|
| 0407244A1 | 1/1991 | European Pat. Off. . |
| 0517137A2 | 12/1992 | European Pat. Off. . |
| 1530906 | 6/1968 | France . |

OTHER PUBLICATIONS

K. Fukuda et al., Off–Track Capabiltiy of a Pole Trimmed Thin Film Head, Journal of the Magnetics Society of Japan, vol. 18, Supplement, No. S1 (1994).

M. Yoshida et al., Edge Eliminated Head, IEEE Transactions on Magnetics, vol. 29, No. 6, Nov. 1993, pp. 3837–3839.

"Development of Technologies for 2–Gb/in² Areal Density Recording", Masaaki Futamoto and Fumio Kugiya, *Electronics and Communications in Japan*, Mar., 1993, pp. 94–103.

*Primary Examiner*—Carl E. Hall
*Attorney, Agent, or Firm*—Kinney & Lange

[57] ABSTRACT

A thin-film head has patterned pole tips and a smooth interface surface topography which eliminates the accumulation of foreign material around the pole tips.

7 Claims, 9 Drawing Sheets

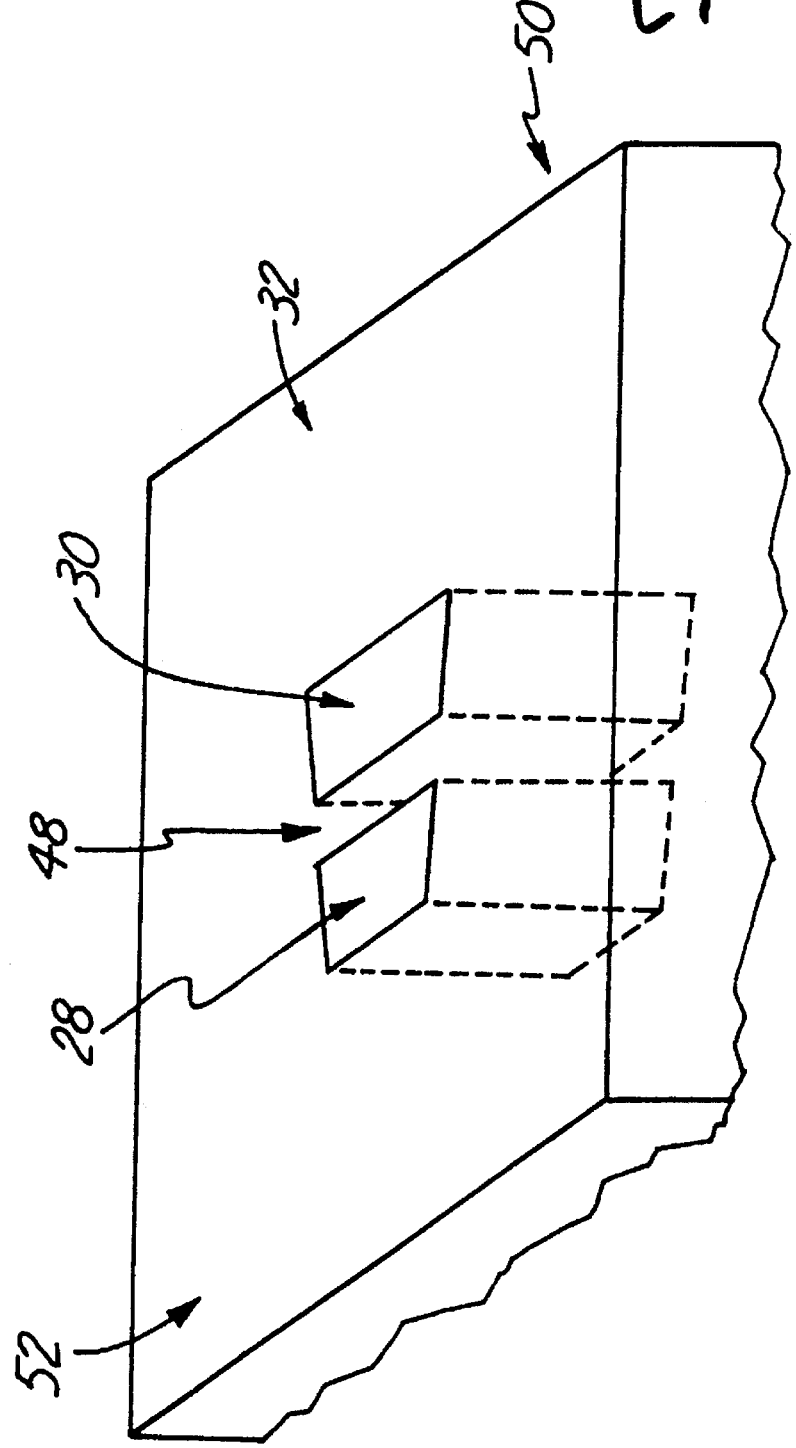

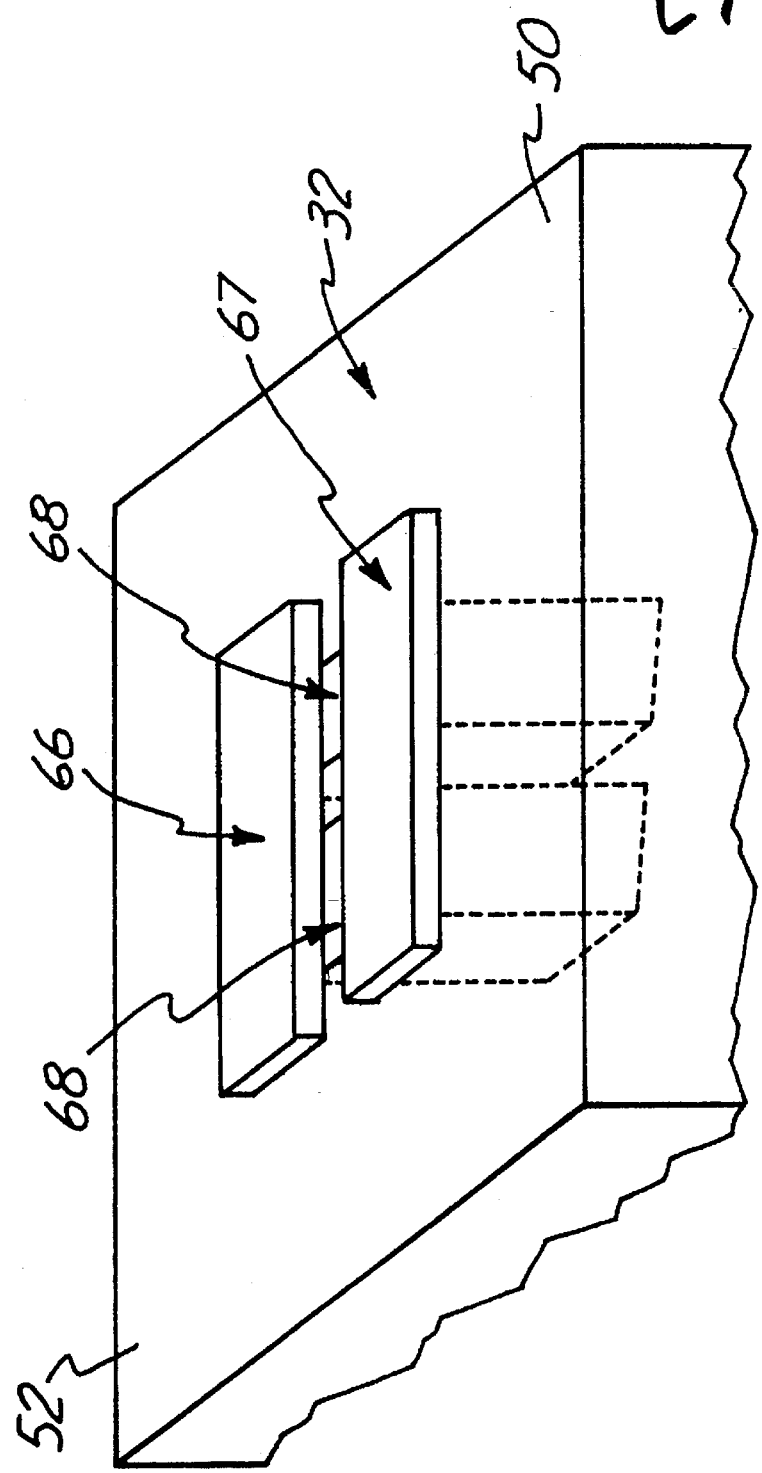

METHOD OF MAKING A SMOOTH TOPOGRAPHY HEAD/DISK INTERFACE SURFACE ON A HEAD WITH PATTERNED POLE

BACKGROUND OF THE INVENTION

The present invention relates to the surface of a thin-film magnetic head serving as the interface between the head and a recording medium. More particularly, it relates to a thin-film head with a smooth topography interface surface which has patterned magnetic poles.

In magnetic recording devices, thin-film magnetic heads retrieve ("read") and store ("write") information to magnetic media by magneto-resistively or inductively sensing the magnetization of and creating respectively, localized magnetic domains in the media. When reading information from a magnetic medium, a thin-film head's interface surface moves over the medium at a short distance from the medium so that magnetic flux from the localized domains enters permeable material pole tips in the interface surface. This flux extends over a selected permeable material path from the surface of the pole tips at the interface surface to an electromagnetic transducer which converts the magnetic flux in the path into an electric read current. The electric read current is used by the recording device in which the head is mounted to create an electric read signal.

Thin-film heads are usually constructed using material deposition and etching techniques similar to those used in monolithic integrated circuit construction. In production, large numbers of heads are constructed on a large substrate, usually a wafer, by material deposition and etching techniques which construct the thin-film heads by layers. The heads are built up in a direction parallel to the plane of the eventual interface surface which is perpendicular to the plane of the substrate surface. This means that the basis for the eventual interface surface is located within the wafer when the deposition and etching process on the wafer is finished.

To expose the surface of the pole tips after this process, the wafer is sliced into rows near the ends of the pole tips. For each thin-film head, this creates a working surface that includes the surfaces of the pole tips. In some methods, the individual thin-film heads are simply cut from these rows and placed, as is, into magnetic recording devices with the working surfaces serving as the interface surfaces. In such methods, the shape of the pole tips is determined by the wafer-level etching and deposition procedures.

However, in other methods, the ends of the pole tips near the working surface are reshaped after the thin-film heads are cut into rows. To reshape the pole tips, the rows of thin-film heads are rotated to place the working surfaces in a common plane. Portions of the working surfaces are then masked with a layer of photoresist using known photoresist technology. A removal agent, such as an etching substance or ion milling beam, is then directed towards the masked and unmasked portions of the working surfaces. The removal agent removes material from the unmasked portions without affecting the masked portions, creating a depression around the masked portions and reshaping the ends of the pole tips near the pole tip surfaces.

When the head is placed in a magnetic recording device, the milled out depression around the patterned pole tips tends to accumulate foreign material around the pole tips during use. This foreign material often leads to device failures because of resulting mechanical damage to the pole tips. Prior approaches attempted to minimize this accumulation by opening channels in the pole tips to allow the foreign material to pass through the pole tips. This strategy has not been successful in removing all of the foreign material that accumulates in the depression and therefore has not eliminated the mechanical damage associated with the depressions.

SUMMARY OF THE INVENTION

The present invention is a thin-film head with patterned poles and a smooth interface surface topography. The poles are patterned after the wafer has been cut into rows by etching around a masked portion of the pole tips. The depression in the interface surface created by this etching is removed by depositing a fill material over the entire interface surface. This fill material is then selectively removed until the pole tips are once again exposed and the interface surface has a smooth topography.

In preferred embodiments, the pole tips are masked with a photoresist which bonds to the areas of the interface surface which are to remain intact through the etching process. After the etching or milling is finished, the photoresist is not removed. Instead, fill material is deposited directly over both the areas covered by the photoresist and the areas not covered by the photoresist.

The fill material on top of the photoresist is removed by either a purely mechanical process or the combination of a mechanical process and a heating process involving a laser beam. In the purely mechanical process, the fill material is repeatedly struck causing the photoresist to fracture from the interface surface. This fracturing causes the photoresist and the fill material covering the photoresist to break off from the interface surface. In the second method of removing the photoresist, a laser heats the photoresist indirectly by heating the fill material. The heat causes the photoresist to craze and the small cracks formed in the photoresist when it crazes reduce the strength of its bond to the interface surface. A low intensity mechanical process then fractures the photoresist from the pole tip surface causing the photoresist and the fill material covering it to fall away from the pole tips.

The fill material which does not cover the photoresist is reduced to the level of the shaped pole tips by lapping the fill material. The lapped material creates a smooth topography with the pole tip surfaces and thus removes the depressions around the pole tips which accumulate foreign material.

Thus, the present invention creates a smooth topography interface surface with patterned poles. This smooth topography eliminates depressions in the interface surface which can accumulate foreign material. Because it does not accumulate foreign material, the thin-film head of the present invention suffers from less mechanical damage than many thin-film heads of the past.

BRIEF DESCRIPTION OF THE DRAWINGS

FIG. 3A is an isometric view of the working surface of a partially constructed thin-film head after being cut from the wafer of FIG. 1;

FIG. 3F is an isometric view of the partially constructed thin-film head after the photoresist of the masked portions has been removed; and FIG. 3G is an isometric view of the thin-film head after the fill material has been lapped so that it is level with the shaped pole tips.

DETAILED DESCRIPTION OF THE PREFERRED EMBODIMENTS

Figure 1:
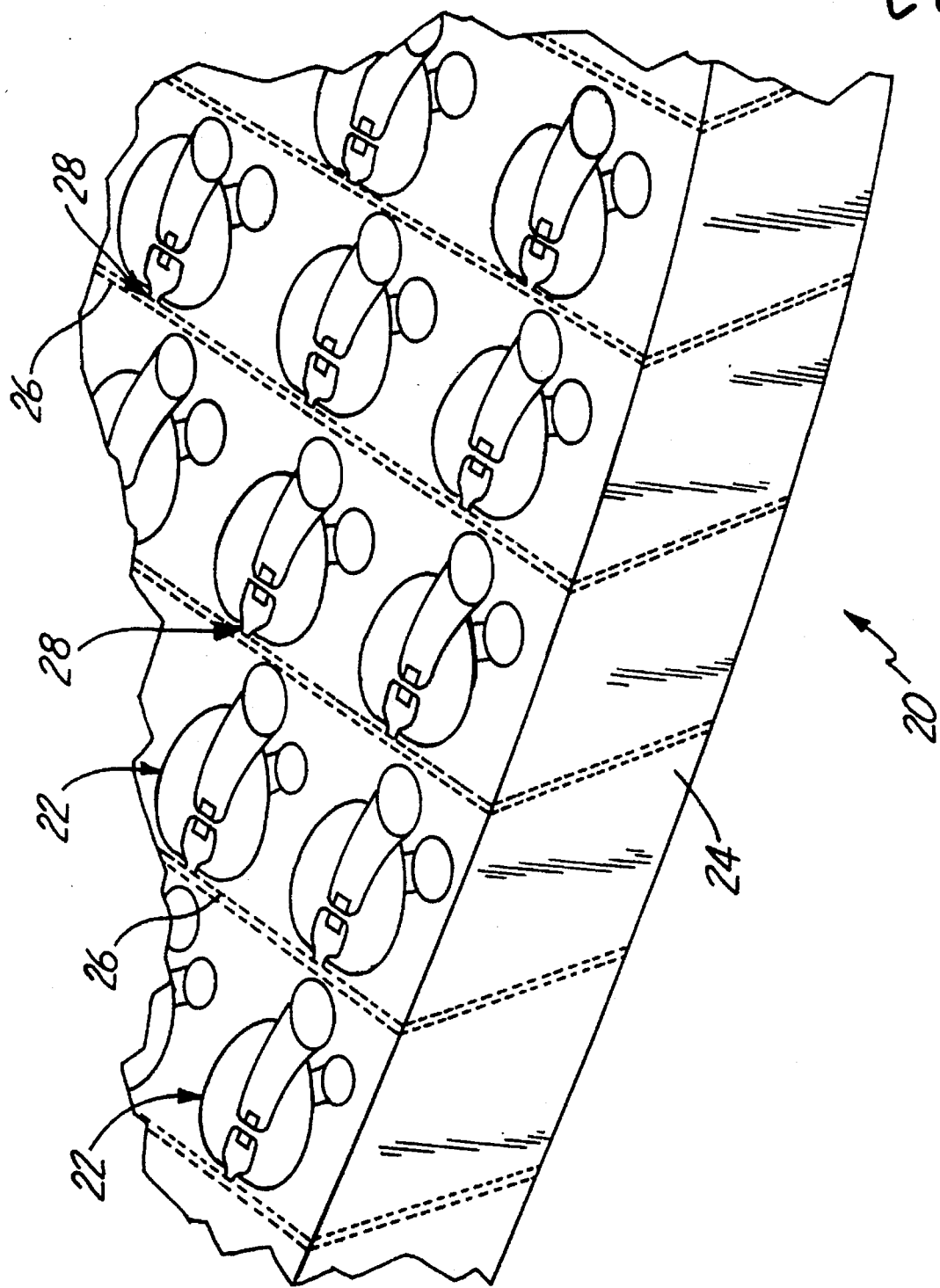
FIG. 1 is a portion of a wafer of partially constructed thin-film heads.

FIG. 1 is a portion of a wafer 20 containing a plurality of partially constructed inductive thin-film heads 22 formed through appropriate material depositions and etchings on a substrate 24 in a well known manner. To avoid obscuring the view of the remainder of the heads, FIG. 1 does not show a final insulation layer which lies over the top of thin-film heads 22. Thin-film heads 22 are constructed in rows and are cut from wafer 20 along cut lines 26 which intersect top pole tips 28 and bottom pole tips 30 (not shown).

Figure 2:
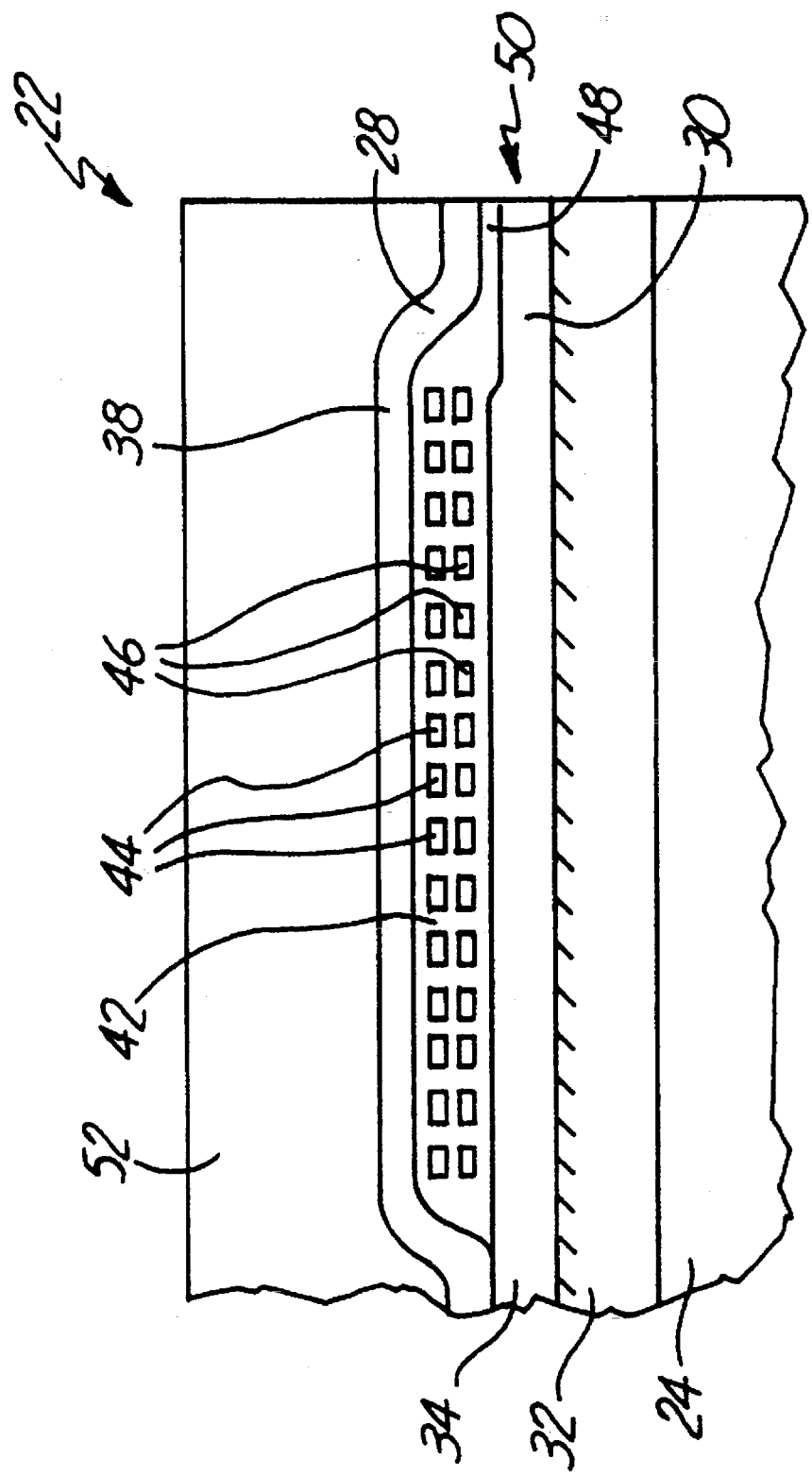
FIG. 2 is a cross-sectional side view of an inductive partially constructed thin-film head.

FIG. 2 is a cross-sectional side view of an inductive thin-film head 22 broken away from wafer 20. Working surface 50 shown on the right side of thin-film inductive head 22, is the surface produced by cut lines 26 of FIG. 1. Thin-film head 22 is constructed in wafer 20 by depositing and etching layers of material onto substrate 24. In general, a bottom insulating layer 32 of nonmagnetic material such as $Al_2O_3$ is first deposited on substrate 24. A bottom core leg 34 forming a bottom pole tip 30 near working surface 50 is deposited on top of bottom insulating layer 32. A top core leg 38 is formed above bottom core leg 34 and forms top pole tip 28 near working surface 50. The two core legs are typically constructed out of a nickel-iron alloy chosen for its magnetic properties. Between top core leg 38 and bottom core leg 34 is an insulating material 42 which houses conductive coils 44 and 46. Top pole tip 28 and bottom pole tip 30 form a gap 48 between them which is typically filled with a nonmagnetic material such as $Al_2O_3$. Above top core leg 38 is top insulating layer 52 which is also preferably $Al_2O_3$. Cut line 26 cuts through top insulating layer 52, top pole tip 28, gap 48, bottom pole tip 30 and bottom insulating layer 32 to form working surface 50 which is perpendicular to the plane of substrate 24.

In operation in a magnetic recording device, working surface 50 is placed proximate to a magnetic media containing localized magnetic domains. As top pole tip 28 and bottom pole tip 30 encounter these local domains, magnetic flux from the domains extends through top core leg 38 and bottom core leg 34. In an inductive head, such as the one shown in FIG. 2, the changing magnetic flux induces current to flow through conductive coils 44 and 46. The direction of the current flow is indicative of the direction of the magnetic fields of the localized domains. Thus, the current through conductive coils 44 and 46 represents the magnetic signal stored as the magnetization of the magnetic medium's local domains. Although an inductive head is shown in FIG. 2, those skilled in the art will recognize that the smooth topography interface surface with patterned poles described below may be used with other types of heads including magneto-resistive heads.

FIG. 3A is an isometric view of working surface 50 just after partially constructed thin-film head 22 has been cut from wafer 20 along cut line 26 of FIG. 1. Portions of bottom pole tip 30 and top pole tip 28 below working surface 50 are shown in dashed line form while the cross-sectional surfaces of the pole tips at working surface 50 are shown in solid line form. Pole tips 28 and 30 have a cross-sectional trapezoidal shape resulting from the material depositions and etchings performed to construct thin-film head 22 on top of substrate 24. Bottom insulating layer 32, gap 48 and top insulating layer 52 are typically constructed of the same nonmagnetic material. Together, they surround pole tips 28 and 30 at working surface 50 to form an integral unit.

After cutting thin-film heads 22 along cut line 26 in wafer 20, the rows of thin-film heads are broken off wafer 20 and rotated to substantially place all of the working surfaces 50 of all the rows in a common plane. The rotated rows are then composed into a single unit by means of an adhesive which allows further deposition and etching techniques to be performed in a batch process at or near working surfaces 50 to reshape the ends of top pole tip 28 and bottom pole tip 30 near working surfaces 50. As discussed below, after the ends of these pole tips are reshaped, an interface surface is created which has a smooth topography.

Figure 3B:
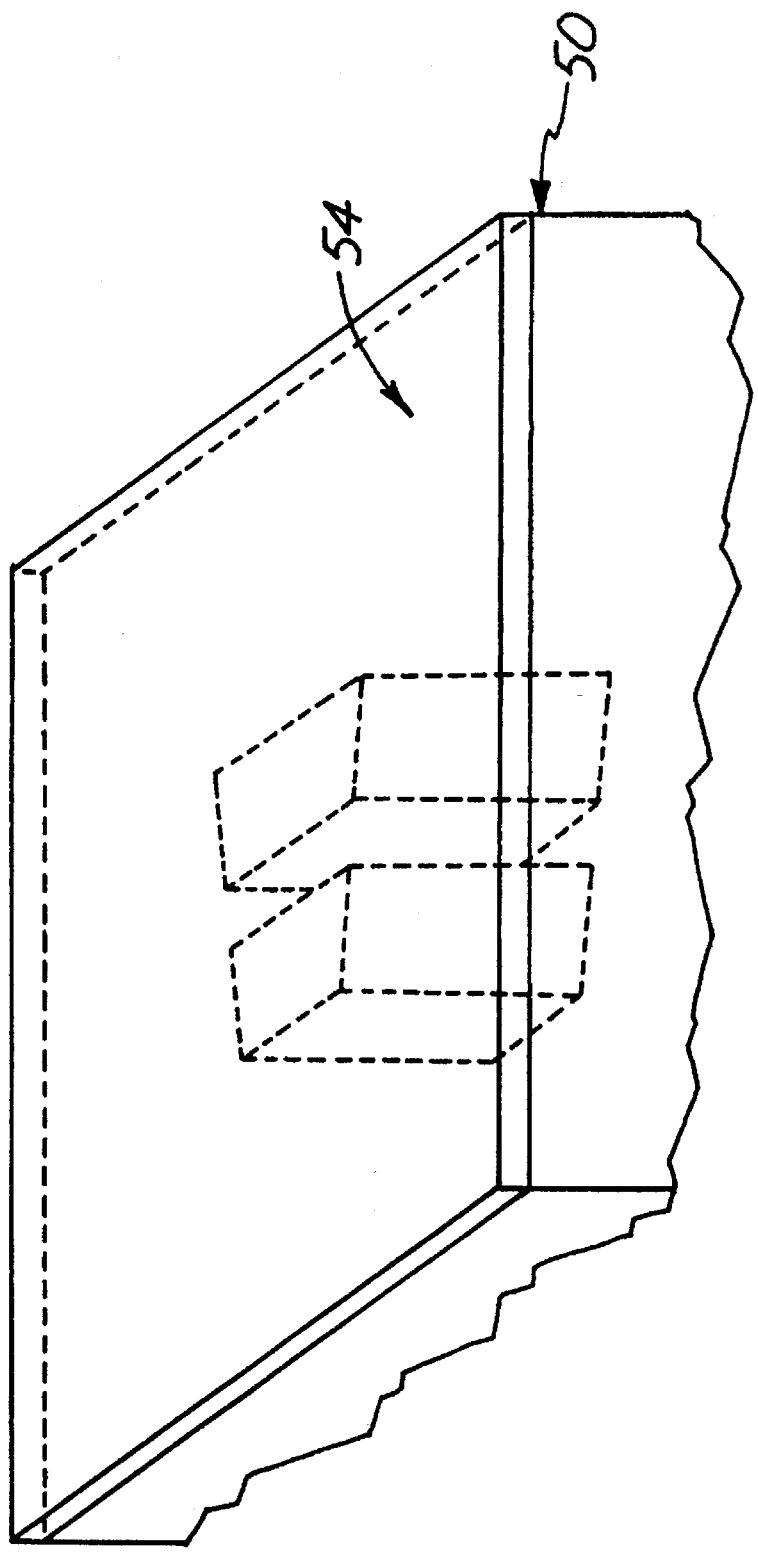
FIG. 3B is an isometric view of the partially constructed thin-film head of FIG. 3A with a film of photoresist applied to the working surface.
Figure 3C:
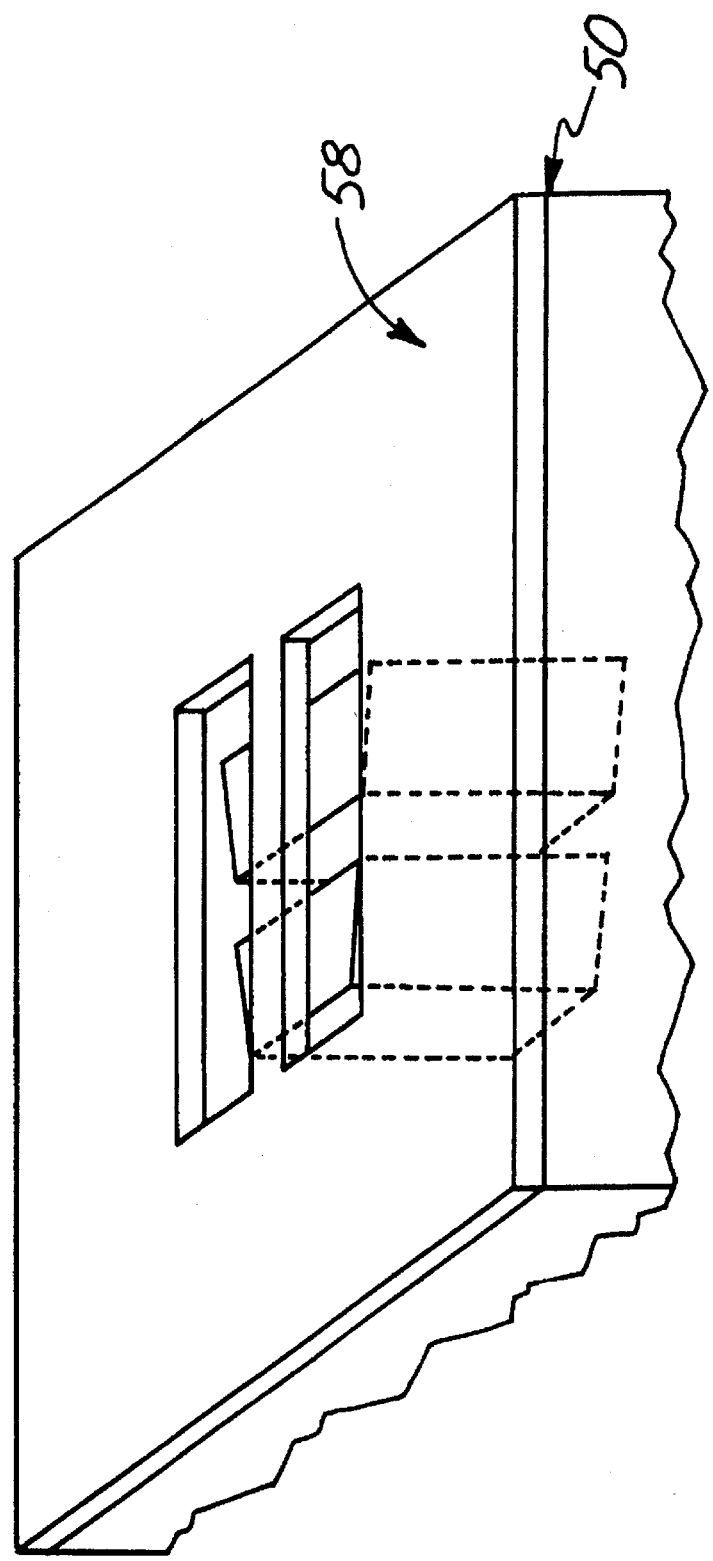
FIG. 3C is an isometric view of the partially constructed thin-film head with the unmasked portions of the photoresist removed.

To begin the pole tip reshaping process, a thin film of photoresist 54 is deposited over the entirety of working surface 50 in a well known manner, as shown in FIG. 3B. Photoresist 54 can be one of many well known materials sensitive to electromagnetic radiation of certain wavelengths whose etching characteristics change when exposed to such radiation. Photoresist 54 is exposed to a pattern of such radiation by passing the radiation through a photomask which spatially filters the radiation allowing radiation to impinge only certain areas of photoresist 54. Those selected portions of photoresist 54 impinged upon by the radiation are altered with respect to those portions which are not impinged upon. This alteration results in areas on working surface 50 where photoresist 54 is tightly bound to the surface and areas where photoresist 54 is lightly bound to the surface. Additional well known processing steps remove the lightly bound resist and harden the tightly bound resist, forming a pattern of hardened resist. Such a pattern is shown in FIG. 3C where a photoresist pole tip mask 58 is the only portion of photoresist 54 left after the photoresist is developed.

Figure 3D:
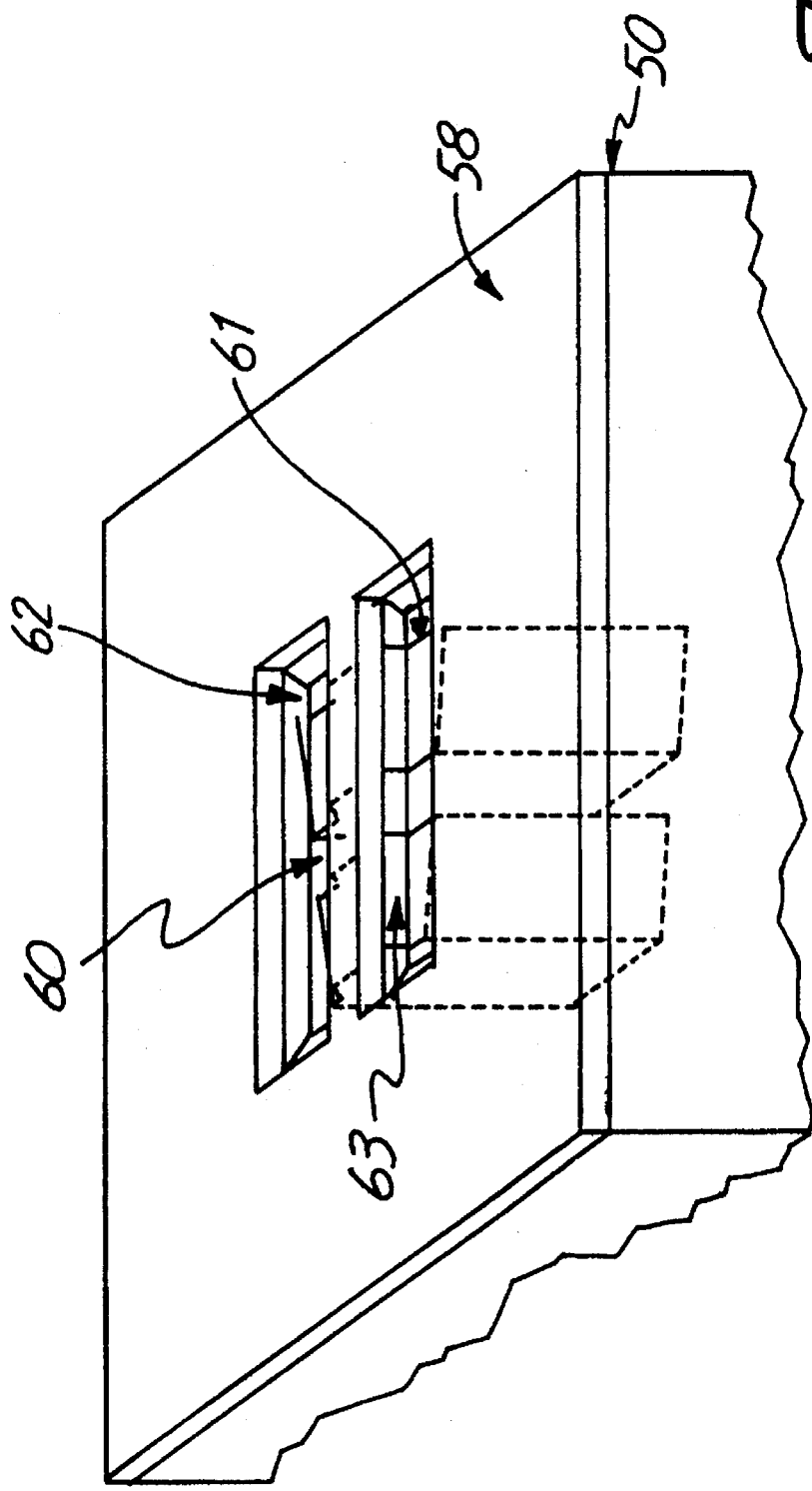
FIG. 3D is an isometric view of the partially constructed thin-film head after unmasked material has been removed.

The pole tip reshaping process continues with the removal of head material near working surface 50 not covered by pole tip mask 58. This material may be removed to a selected depth through chemical etching or ion milling, both well known methods for removing material from thin-film heads. As shown in FIG. 3D, the removal of this material creates two depressions 60 and 61, each approximately 0.05 to 0.5 µm deep. Between depressions 60 and 61, and pole tip mask 58 are canted walls 62 and 63 respectively. Canted walls 62 and 63 are a result of limitations in the material removal process.

Figure 3E:
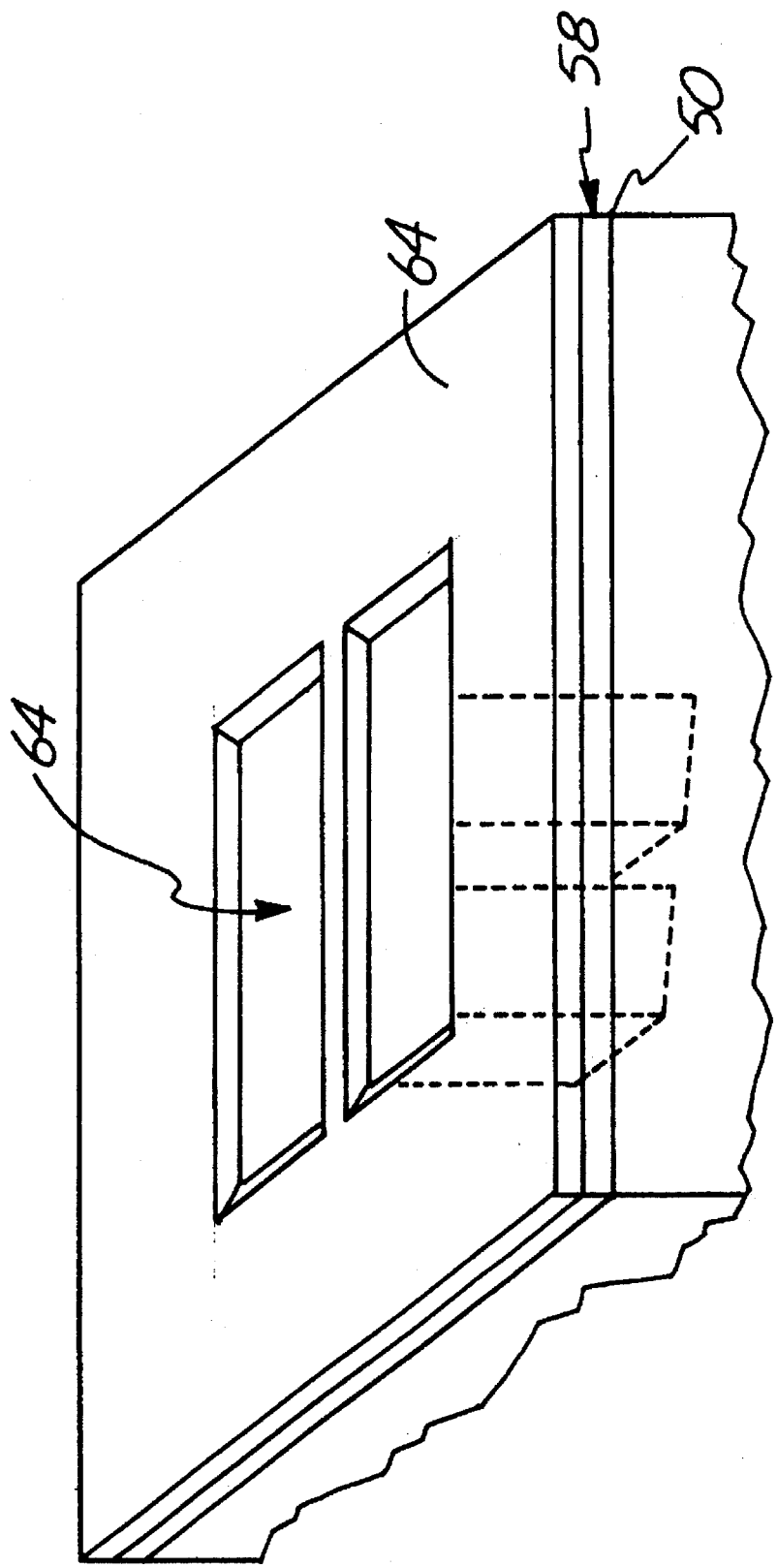
FIG. 3E is an isometric view of the partially constructed thin-film head after fill material has been added to the depression.
Figure 39:
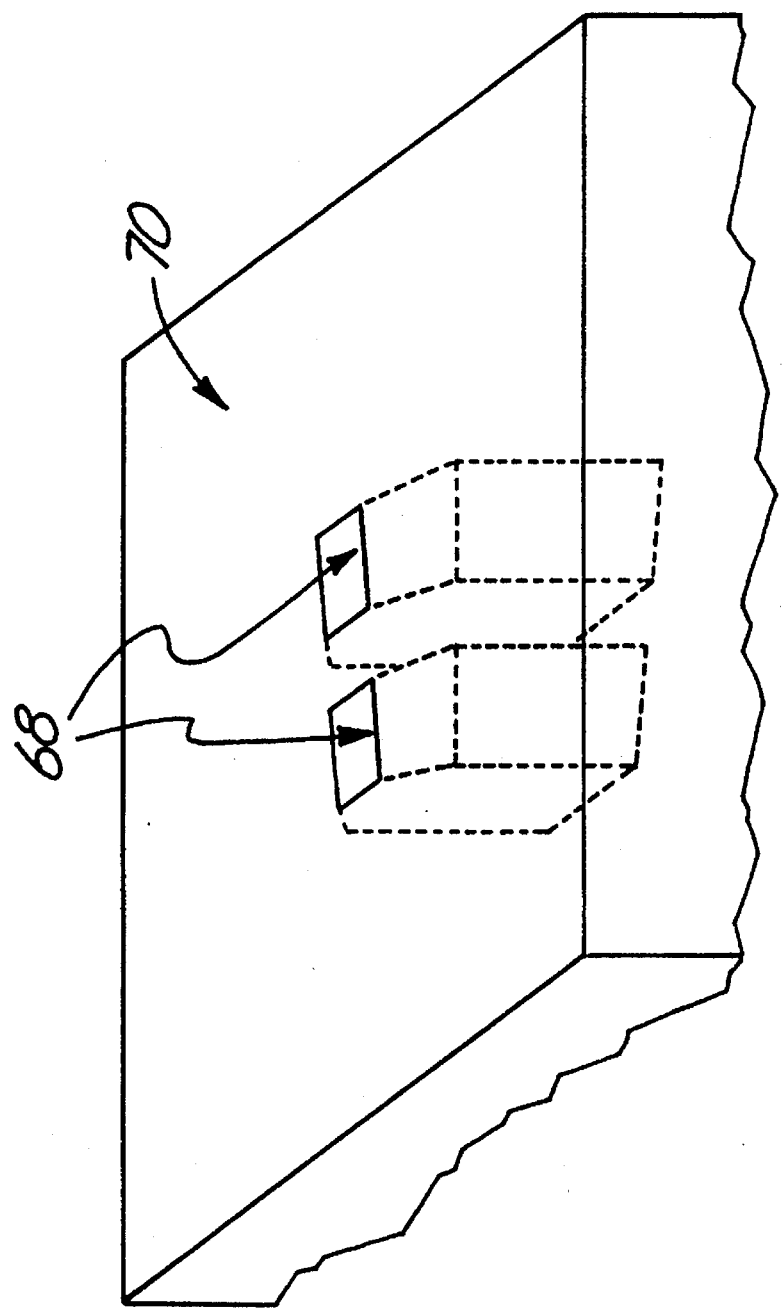

To fill in depressions 60 and 61, a fill material 64 is deposited in a well known manner over depressions 60 and 61, and pole tip mask 58, as shown in FIG. 3E. Fill material 64 is deposited to a height such that the fill material covering depression 60 is the same height or higher than the remainder of working surface 50. Fill material 64 is preferably the same material, typically $Al_2O_3$, found in top insulating layer 52, gap 48 and bottom insulating layer 32. Having the same material in all of these areas is helpful in producing a level interface surface as discussed below.

After fill material 64 has been deposited, pole tip mask 58 is removed from the remainder of working surface 50. When pole tip mask 58 is removed, fill material 64 which covers this area fractures from the remaining portions of fill material 64 covering depressions 60 and 61. This leaves two areas of excess fill 66 and 67 as shown in FIG. 3F. With the removal of pole tip mask 58, shaped pole tips 68 are exposed.

Pole tip mask 58 may be removed using one of two methods. The first is a purely mechanical method in which the surface of fill material 64 is repeatedly struck to create fractures in the photoresist of pole tip mask 58. These fractures cause pole tip mask 58 to separate from the remaining portions of working surface 50. As discussed above, the removal of pole tip mask 58 causes the fill material covering this area to fracture from the remainder of the fill material.

The second method for removing the photoresist of pole tip mask 58 uses a laser to heat fill material 64 which, in turn, heats pole tip mask 58. When the photoresist material of pole tip mask 58 is heated, it crazes, forming minute cracks throughout. These minute cracks weaken the photoresist's bond to the remaining portions of working surface 50 and a low intensity mechanical process may be used to separate pole tip mask 58 from those remaining portions.

The final step to forming a smooth topography interface surface with patterned poles is the lapping of excess fill 66 and 67. Lapping consists of a controlled rubbing against an abrasive such as a diamond slurry. Since excess fill 66 and 67, top insulating layer 52, gap 48 and bottom insulating layer 32 are all preferably the same material, the lapping process erodes the material at the same rate in all four areas. This makes it much easier to produce a smooth topography interface surface 70 such as shown in FIG. 3G. After the lapping is completed, interface surface 70 is completely smooth.

By adding fill material to the depressions created when forming patterned pole tips, the present invention eliminates the depressions and provides a smooth topography interface surface. This smooth topography is less likely to suffer damage from accumulated foreign material.

Although the present invention has been described with reference to preferred embodiments, workers skilled in the art will recognize that changes may be made in form and detail without departing from the spirit and scope of the invention.

What is claimed is:

1. A method for producing thin-film head transducers, the method comprising:

depositing and etching materials on a wafer to create a plurality of partial thin-film heads;

cutting rows of partial thin-film heads from the wafer, the cut rows exposing working surfaces having pole tip surfaces;

rotating the thin-film heads so that the working surfaces are substantially in a common plane;

masking the working surfaces, creating masked portions on the working surface covered by-masking material and unmasked portions on the working surface not covered by masking material;

removing material adjacent to the working surface in the unmasked portions of the working surface to a selected depth to form exposed surfaces in the partial thin-film heads;

depositing a fill material on the masking material and the exposed surfaces; and removing the fill material to form a smooth interface surface having pole tip surfaces.

2. The method of claim 1 wherein masking the working surface comprises:

applying a photoresist to the working surface;

exposing the applied photoresist to a pattern of electromagnetic radiation, the pattern of radiation creating a pattern of bonded and unbonded photoresist; and removing the unbonded photoresist.

3. The method of claim 2 wherein the fill material over the photoresist is removed by mechanically fracturing the photoresist so that it is no longer bonded to the working surface after the fill material is deposited.

4. The method of claim 2 wherein the fill material over the photoresist is removed by using both a thermal process and a mechanical process to remove the photoresist from the working surface after the fill material is deposited.

5. The method of claim 4 wherein the thermal process includes using a laser to craze the photoresist.

6. The method of claim 5 wherein the mechanical process removes the crazed photoresist from the working surface.

7. The method of claim 2 wherein portions of the fill material over the exposed surface are removed by lapping.

* * * * *